United States Patent
Wang et al.

(10) Patent No.: US 9,583,956 B2
(45) Date of Patent: Feb. 28, 2017

(54) CHARGING DEVICE, METHOD FOR CONTROLLING CHARGING DEVICE AND METHOD FOR DETECTING PERIPHERAL DEVICE

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Xinghui Wang, Guangdong (CN); Jianhua Zhang, Guangdong (CN); Xiaofeng Shen, Guangdong (CN); Kaihua Niu, Guangdong (CN); Xiao Chen, Guangdong (CN); Jianwei Huang, Guangdong (CN); Chaojie Zong, Guangdong (CN); Lin Liu, Guangdong (CN)

(73) Assignees: BYD Company Limited, Shenzhen, Guangdong (CN); Shenzhen BYD Auto R&D Company Limited, Shenzhen, Guangdong (CN)

( * ) Notice: Subject to any disclaimer, the term of this patent is extended or adjusted under 35 U.S.C. 154(b) by 321 days.

(21) Appl. No.: 14/308,677

(22) Filed: Jun. 18, 2014

(65) Prior Publication Data

US 2014/0292261 A1 Oct. 2, 2014

Related U.S. Application Data

(63) Continuation of application No. PCT/CN2012/085875, filed on Dec. 4, 2012.

(30) Foreign Application Priority Data

Dec. 28, 2011 (CN) .......................... 2011 1 0445376

(51) Int. Cl.
*H02J 7/00* (2006.01)
*H02J 7/02* (2016.01)
(Continued)

(52) U.S. Cl.
CPC .......... *H02J 7/0052* (2013.01); *B60L 3/0023* (2013.01); *B60L 3/0046* (2013.01); *B60L 3/0069* (2013.01);
(Continued)

(58) Field of Classification Search
CPC ...... H02J 7/0027; H02J 7/0036; H02J 7/0052; H02J 7/027; H02J 7/04; B60L 11/1816;
(Continued)

(56) References Cited

U.S. PATENT DOCUMENTS 5,614,808 A    3/1997  Konoya et al.
7,267,090 B2 * 9/2007  Tamai ................. B60L 11/1868
                                                   123/179.3
(Continued)

FOREIGN PATENT DOCUMENTS

CN    101740947 A    6/2010
CN    201877858 U    6/2011
(Continued)

OTHER PUBLICATIONS

PCT International Search Report mailed Mar. 28, 2013, issued in International Application No. PCT/CN2012/085875 (3 pages).
(Continued)

Primary Examiner — Nathaniel Pelton
(74) Attorney, Agent, or Firm — Finnegan, Henderson, Farabow, Garrett & Dunner, LLP (57) ABSTRACT

A charging device, a method for controlling a charging device, and a method for detecting a peripheral device are provided. The charging device comprises: a charging gun; a power module; and a controlling module coupled with the
(Continued)

charging gun and the power module, wherein the controlling module is configured to determine whether the charging gun is connected with a peripheral device to be charged, and if yes, to control the power module to convert AC electricity to DC electricity to charge the peripheral device. A method for controlling a charging device is also provided. The method comprises: determining whether the charging gun is connected with a peripheral device; and if yes, controlling the power module to convert AC electricity to DC electricity to charge the peripheral device if the charging gun is determined to be connected to the peripheral device.

14 Claims, 6 Drawing Sheets

(51) Int. Cl.
*B60L 3/00* (2006.01)
*B60L 3/12* (2006.01)
*B60L 11/18* (2006.01)
*H02J 7/04* (2006.01)

(52) U.S. Cl.
CPC ............. *B60L 3/12* (2013.01); *B60L 11/1816* (2013.01); *B60L 11/1846* (2013.01); *B60L 11/1848* (2013.01); *H02J 7/027* (2013.01); B60L 2230/00 (2013.01); B60L 2230/16 (2013.01); B60L 2240/80 (2013.01); H02J 7/0027 (2013.01); H02J 7/0036 (2013.01); H02J 7/04 (2013.01); Y02T 10/7005 (2013.01); Y02T 10/7055 (2013.01); Y02T 10/7088 (2013.01); Y02T 90/121 (2013.01); Y02T 90/128 (2013.01); Y02T 90/14 (2013.01); Y02T 90/163 (2013.01); Y02T 90/169 (2013.01); Y04S 30/14 (2013.01)

(58) Field of Classification Search
CPC .............. B60L 11/1846; B60L 11/1848; B60L 2230/16
USPC .................................................. 320/107, 109
See application file for complete search history.

(56) References Cited

U.S. PATENT DOCUMENTS

| | | |
|---|---|---|
| 2009/0102433 A1 | 4/2009 | Kamaga |
| 2010/0217485 A1* | 8/2010 | Ichishi ................ B60L 11/1824 701/36 |
| 2010/0301810 A1 | 12/2010 | Biondo et al. |
| 2011/0140835 A1 | 6/2011 | Ishibashi |
| 2011/0285345 A1* | 11/2011 | Kawai ................ B60L 11/1825 320/107 |
| 2012/0007554 A1* | 1/2012 | Kanamori ........... B60L 11/1824 320/109 |

FOREIGN PATENT DOCUMENTS

| | | |
|---|---|---|
| CN | 201918773 U | 8/2011 |
| JP | H 6-325830 A | 11/1994 |
| JP | H 10-215523 A | 8/1998 |
| JP | 2009-201198 A | 9/2009 |
| JP | 2010-103870 A | 5/2010 |
| JP | 2010-226818 A | 10/2010 |
| JP | 2011-114998 A1 | 6/2011 |
| WO | WO 2013/097583 A1 | 7/2013 |

OTHER PUBLICATIONS

Extended European Search Report dated Oct. 22, 2015, issued in related European Application No. 12861647.1 (6 pages).
Supplemental European Search Report dated Nov. 10, 2015, issued in related European Application No. 12861647.1 (1 page).

* cited by examiner

CHARGING DEVICE, METHOD FOR CONTROLLING CHARGING DEVICE AND METHOD FOR DETECTING PERIPHERAL DEVICE

CROSS-REFERENCE TO RELATED APPLICATIONS

This application is a continuation of International Application No. PCT/CN2012/085875, filed on Dec. 4, 2012, which claims priority to and benefits of Chinese Patent Application No. 201110445376.X, filed with the State Intellectual Property Office (SIPO) of China on Dec. 28, 2011. The entire contents of the above-referenced applications are incorporated herein by reference.

FIELD

The present disclosure relates generally to an electronic device, and more particularly, to a charging device, a method for controlling a charging device and a method for detecting a peripheral device to be charged by a charging device.

BACKGROUND

As electric vehicles become competitive alternatives to conventional vehicles, charging cabinets are developed to safely and efficiently charge electric vehicles.

A traditional charging cabinet needs to meet different charging requirements for different electric vehicles, which leads to the possibility of charging fault. In addition, the anode and the cathode of a charging entrance of the electric vehicle may be reversely connected during manufacturing or after a repair, which may result in an abnormal charging. Therefore, extensive diagnosis for the charging entrance before the charging is needed. Besides, since traditional charging cabinet is inconvenient to move because of huge size, the electric vehicle must be moved into the charging cabinet to perform the diagnosis, which is inconvenient.

In addition, the inventor of the present disclosure found that traditional charging cabinet can only detect whether the charging entrance is abnormal, but cannot determine where charging fault, if any, appears. Therefore, the charging cabinet needs to be manually checked to confirm where the charging fault appears, which is both time-consuming and expensive.

Therefore, there is a need for a charging device which not only can efficiently and reliably charge electric vehicles, but also allows easy monitoring of its working state.

SUMMARY

According to an embodiment of the present disclosure, a charging device comprises: a charging gun; a power module; and a controlling module coupled with the charging gun and the power module respectively. The controlling module is configured to determine whether the charging gun is connected with a peripheral device, and to control the power module to convert the AC electricity to the DC electricity to charge the peripheral device, if the charging gun is determined to be connected to the peripheral device. In some embodiments, in order to determine that the charging gun is connected to the peripheral device, the controlling module is further configured to wait for a connection confirming signal from the charging gun, to send a first request to the charging gun, and to wait for a first message from the charging gun. In some embodiments, the first message indicates a working state of the charging gun. In some embodiments, if the first request to be sent is not of a last item to be sent to the charging gun, the controlling module is further configured to send a second request after the first request is sent. In some embodiments, the controlling module is further configured to send a third request to stop the charging gun from sending the first message, and to receive a time-out signal from the charging gun after the third request is sent.

According to an embodiment of the present disclosure, the controlling module further comprises: a connection determining unit coupled with the charging gun and configured to determine whether the charging gun is connected with the peripheral device; a sending unit configured to send a second message periodically to the peripheral device; a timing unit configured to stop the sending unit from sending the second message after a first time period; and a receiving unit configured to receive a first response after the sending unit is stopped from sending the second message by the timing unit. In some embodiments, the charging device further comprises a low voltage auxiliary power source for supplying power to the controlling module, and the controlling module further comprises a judging unit configured to judge whether the second message is a message of a last item to be sent to the peripheral device. The controlling module may also comprise a reset unit configured to reset the low voltage auxiliary power source if the second message is not a message of a last item.

In some embodiments, if the second message is not a message of a last item, the sending unit is further configured to send a third message periodically to the peripheral device. The timing unit is also further configured to stop the sending unit from sending the third message after a first time period. The control unit is also configured to determine whether the receiving unit receives a second response from the peripheral device within a second time period after the sending unit is stopped from sending the second message, and to control the charging gun to charge the peripheral device if the receiving unit is determined to have received the second response within the second time period. In some embodiments, the sending unit sends the third message after the reset unit resets the low voltage auxiliary power source unit. In some embodiments, the second message and/or the third messages indicate a working state of the charging gun.

The charging device according to an embodiment of the present disclosure uses the low voltage auxiliary power source and the power module in itself to supply power, which may facilitate the mobility of the charging device as well as the performance of charging to the peripheral device. In addition, as the charging device according to the embodiment of the present disclosure uses the controlling module to automatically detect the working state of the charging device before charging the peripheral device, it may improve the safety of the charging activity.

According to another embodiment of the present disclosure, a method for controlling a charging device is provided, wherein the charging device comprises a power module and a power module, the method comprises steps of: determining whether the charging gun is connected with a peripheral device, and controlling the power module to convert the AC electricity to the DC electricity to charge the peripheral device if the charging gun is determined to be connected to the peripheral device. In some embodiments, the determining step include: waiting for a connection confirming signal to judge whether the charging gun is connected with the peripheral device; upon receiving the connection confirming signal, sending a first request to the charging gun; waiting for a first message; and determining that the charging gun is connected to the peripheral device after receiving the first message.

In some embodiments, the charging device further comprises a low voltage auxiliary power source. If the first request is not a request of a last item to be sent, the following steps may be executed: resetting the low voltage auxiliary power source; sending a second request; waiting for a second message; and after receiving the second message, controlling the power module to convert AC electricity to DC electricity to charge the peripheral device. In some embodiments, at least one of the aforementioned messages indicates a working state of the charging gun.

The method for controlling a charging device according to an embodiment of the present disclosure judges whether the charging device is suitable for charging the peripheral device before the charging, which may improve the safety of the charging. In addition, as the charging device has the low voltage auxiliary power source in itself to supply power, it may facilitate the mobility of the charging device as well as the charging performance.

According to still yet another embodiment of the present disclosure, a method for detecting a peripheral device to be charged by a charging device comprises steps of: detecting whether the charging device is connected with a peripheral device; and starting a communication between the charging device and the peripheral device if the charging device is determined to be connected with the peripheral device.

In some embodiments, the communication includes: sending a first message periodically to the peripheral device; stopping sending the first message after a first time period; and waiting for a first response within a second time period. The method further comprises: after receiving the first response within the second time period, controlling the charging device to charge the peripheral device. In some embodiments, if the first message is not a message of a last items, the following steps may be executed: sending a second message periodically to the peripheral device; stopping sending the second message after the first time period; waiting for a second response within the second time period; and after receiving the second response within the second time period, controlling the charging device to charge the peripheral device. In some embodiments, at least one of the aforementioned messages indicates a working state of the charging device.

The method for detecting a peripheral device to be charged by a charging device according to an embodiment of the present disclosure detects whether the connection between the charging device and the peripheral device is normal, which may improve the safety of the charging.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions made with reference the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

The charging device according to the present disclosure will be described with reference to accompanied drawings.

Figure 1:
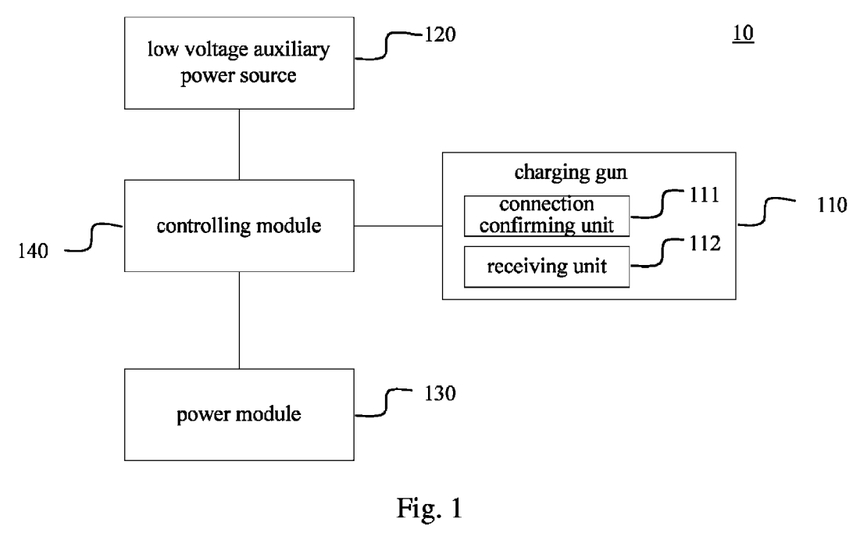
FIG. 1 illustrates an exemplary system for a charging device, according to an embodiment of the present disclosure.

FIG. 1 illustrates an exemplary system for a charging device for a charging device, according to embodiments of the present disclosure. As shown in FIG. 1, a charging device 10 comprises a charging gun 110, a low voltage auxiliary power source 120, a power module 130 and a controlling module 140. The controlling module 140 is coupled with charging gun 110, low voltage auxiliary power source 120 and power module 130 respectively. In some embodiments, charging gun 110 further comprises a connection confirming unit 111 and a receiving unit 112.

In some embodiments, power module 130 is configured to convert AC electricity to DC electricity. Controlling module 140 is configured to control low voltage auxiliary power source 120 to supply power to a circuit coupled with controlling module 140.

In some embodiments, when detecting that charging gun 110 is connected with a peripheral device (not shown), connection confirming unit 111 can send a connection confirming signal to controlling module 140. After receiving the connection confirming signal, controlling module 140 can send a first request to receiving unit 112. If receiving unit 112 receives the first request from controlling module 140, it can acknowledge receiving the first request to controlling module 140 by, for example, sending a first report. A person with ordinary skill in the art will appreciate that "request" and "report" constitute one or more electronic signals, may not require any special format or structure, and can be application-specific. After receiving the first report, controlling module 140 can control power module 130 to convert the AC electricity to the DC electricity to charge the peripheral device.

In some embodiments, controlling module 140 may be further configured to detect whether the first request is the last request (e.g. a request for the last item to be sent to receiving unit 112). The number and sequence of the requests are pre-set by controlling module 140. If the first request is not the last request, controlling module 140 may further reset low voltage auxiliary power source 120 and send a second request to receiving unit 112.

In some embodiments, controlling module 140 may receive one or more messages from receiving unit 112. A person with ordinary skill in the art will appreciate that "message" constitutes one or more electronic signals, does not have any required format or structure, and can be application-specific. The messages may be corresponding to working states of the charging gun respectively, and may include but not be limited to a capacity message, a current message and a rating power message. The first request and/or the second request sent by controlling module 140 may take a form of stopping sending messages to receiving unit 112. The first report and/or the second report may be a time-out report. After receiving the connection confirming signal from connection confirming unit 111, controlling module 140 may stop sending a first message (e.g. the current message) to receiving unit 112 to detect whether the working state corresponding to the first message is normal. If the first report is received by controlling module 140 in a preset time period, controlling module 140 may determine that the working state corresponding to a received message is normal, and may then control power module 130 to convert the AC electricity to the DC electricity to charge the peripheral device.

In some embodiments, charging device 10 may use low voltage auxiliary power source 120 and power module 130 to supply power, which may facilitate mobility of the charging device, as well as its performance in charging to the peripheral device. In addition, as the charging device uses the controlling module to automatically detect the working state of the charging device before charging the peripheral device, it may improve the safety of the charging activity.

Figure 2:
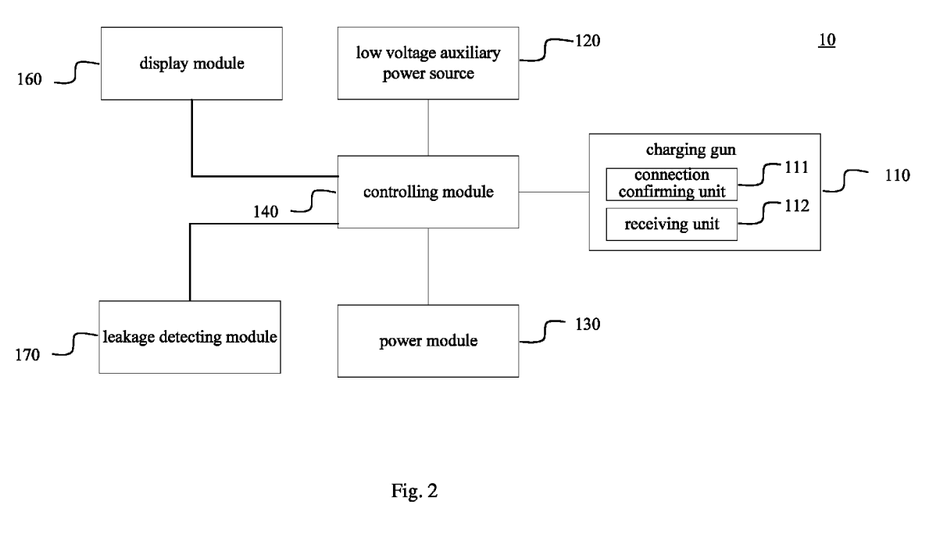
FIG. 2 illustrates an exemplary system for a charging device, according to an embodiment of the present disclosure.

FIG. 2 illustrates an exemplary system for a charging device for a charging device, according to embodiments of the present disclosure. As shown in FIG. 2, charging device 10 further comprises a display module 160 and a leakage detecting module 170. Display module 160 is configured to display items for instructing controlling module 140. Leakage detecting module 170 is coupled with controlling module 140, and is controlled by controlling module 140 to detect leakage of charging device 10.

In some embodiments, display module 160 may be an interactive interface. For example, display module 160 may comprise a plurality of pilot lamps, in which each pilot lamp may indicate a working state for each item. When the working state of an item is normal, the corresponding pilot lamp is lighted, and when the working state is faulty, the corresponding lamp is dark. Hence, people can easily recognize which item has a faulty working state. Otherwise, it may require expensive and time-consuming inspections to figure out which item has a faulty working state.

Figure 3:
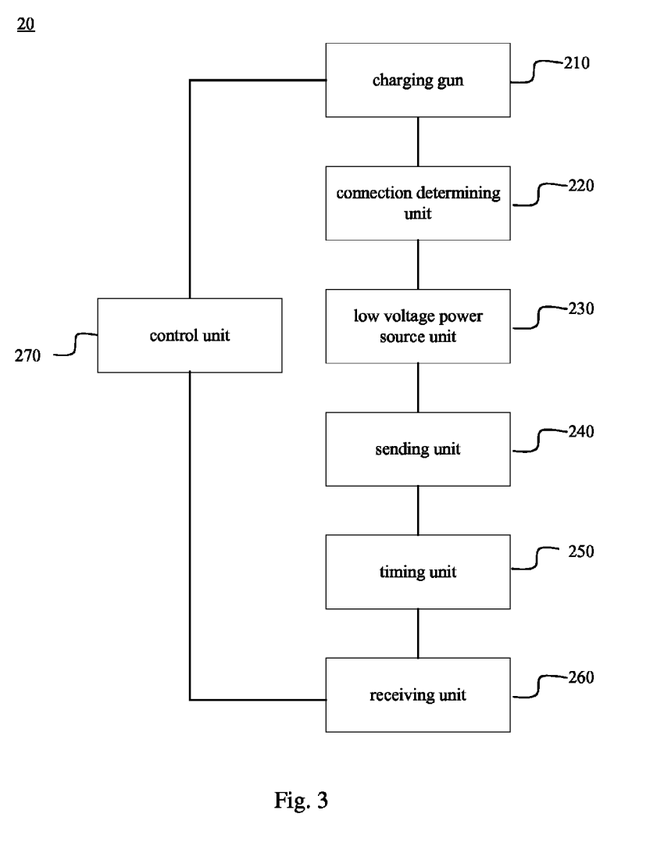
FIG. 3 illustrates an exemplary system for a charging device, according to an embodiment of the present disclosure.

FIG. 3 illustrates an exemplary system for a charging device for a charging device, according to embodiments of the present disclosure. As shown in FIG. 3, charging device 20 comprises a charging gun 210, a connection determining unit 220, a low voltage power source unit 230, a sending unit 240, a timing unit 250, a receiving unit 260 and a control unit 270.

In some embodiments, charging gun 210 is configured to charge a peripheral device (not shown). Connection determining unit 220 is configured to determine whether charging gun 210 is connected with the peripheral device. Low voltage power source unit 230 is configured to enable a communication between charging device 20 and the peripheral device when charging gun 210 is connected with the peripheral device. Low voltage power source unit 230 may provide electricity sufficient for the communication to the peripheral device. Sending unit 240 is configured to send a first message periodically to the peripheral device. Timing unit 250 is configured to stop sending unit 240 from sending the first message after a first time period. Receiving unit 260 is configured to receive a first report from the peripheral device, after sending unit 240 is stopped from sending the first message after the first time period. Control unit 270 is configured to determine whether receiving unit 260 receives the first report within a second time period after sending unit 240 is stopped from sending the first message. If receiving unit 260 is determined to have received the first report within the second time period, control unit 270 is further configured to control charging gun 210 to charge the peripheral device.

In some embodiments, the first message may be one of a capacity message, a current message, a rating power message, etc., each of which corresponds to a working state respectively. When control unit 270 determines that receiving unit 260 has received the first report after sending unit 240 is stopped from sending the first message after the first time period, control unit 270 may indicate that the connection between charging device 20 and the peripheral device is normal, and thus the charging to the peripheral device can be performed.

In some embodiments, the peripheral may be an electric vehicle, and the charging device may communicate with a battery management system in the electric vehicle through a communications network, such as a control area network (CAN).

In some embodiments, charging gun 20 has the low voltage power source unit in itself, which may facilitate the mobility of the charging device, as well as its performance in charging to the peripheral device. In addition, since the charging device can automatically detect whether the connection with peripheral device is normal before charging the peripheral device, it may improve the safety of the charging activity.

Figure 4:
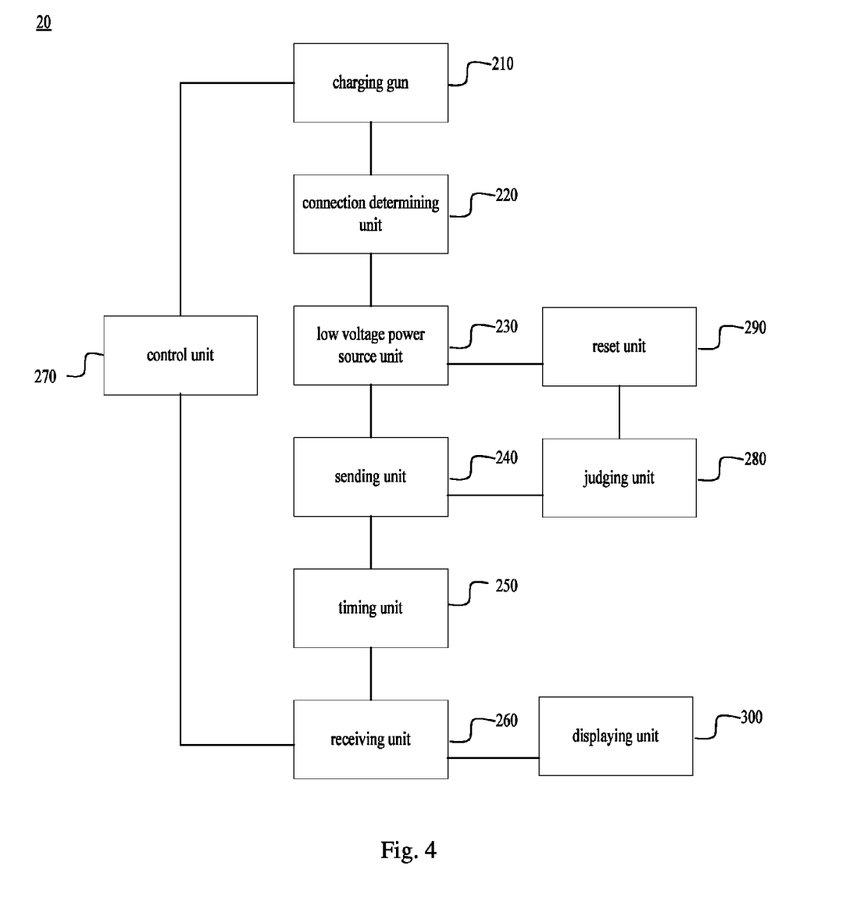
FIG. 4 illustrates an exemplary system for a charging device, according to an embodiment of the present disclosure.

FIG. 4 illustrates an exemplary system for a charging device, according to embodiments of the present disclosure. As shown in FIG. 4, charging device 20 further comprises a judging unit 280, a reset unit 290 and a displaying unit 300. Judging unit 280 is configured to judge whether the first message is a message of a last item to be sent to the peripheral device. The number and sequence of the messages are pre-set. Reset unit 290 is configured to reset low voltage power source unit 230 if the first message is not the message of the last item. After resetting the low voltage power source unit 230, sending unit 240 may send a second message periodically to the peripheral device. After the first time period, timing unit 250 may stop sending unit 240 from sending the second message. Control unit 270 may determine whether receiving unit 260 receives a second report within the second time period from the peripheral device after sending unit 240 is stopping the sending unit from sending the second message. When receiving unit 260 is determined to have received the second report, control unit 270 may control charging gun 210 to charge the peripheral device. The second message may also be one of the capacity message, the current message, the rating power message, etc. In some embodiments, the second message is different from the first message.

In some embodiments, displaying unit 300 is configured to display information indicating whether receiving unit 260 receives the first report or the second report. Displaying unit 300 may comprise a plurality of pilot lamps, each pilot lamp corresponding to a working state of each item respectively. When the working state is normal, the corresponding pilot lamp is lighted. When the working state is faulty, the corresponding lamp is dark. Hence, people could simply recognize which item has a faulty working state. Otherwise, it may require expensive and time-consuming inspections to figure out which item has a faulty working state.

A method for controlling a charging device will be described below with reference to FIG. 5.

Figure 5:
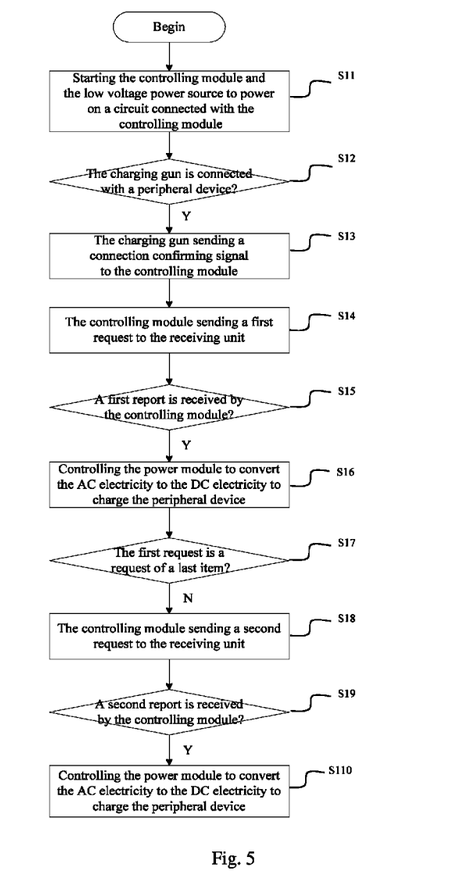
FIG. 5 is a flow chart illustrating an exemplary method for controlling a charging device, according to an embodiment of the present disclosure.

FIG. 5 is a flow chart illustrating an exemplary method for controlling a charging device, according to embodiments of the present disclosure. The charging device may include a charging gun comprising a connection confirming unit and a receiving unit; a controlling module; a low voltage auxiliary power source; and a power module configured to convert an AC electricity to a DC electricity. As shown in FIG. 5, the method for controlling the charging device comprises the following steps:

In step S11, the controlling module and the low voltage power source are started to power on a circuit connected with the controlling module.

In step S12, it is judged whether the charging gun is connected with a peripheral device.

In step S13, if the charging gun is detected to be connected with the peripheral device, a connection confirming signal is sent by, for example, the charging gun.

In step S14, after receiving the connection confirming signal, the controlling module sends a first request to the receiving unit.

In some embodiments, the first request may take a form of stopping sending messages to the receiving unit. The messages may be corresponding to working states of the charging gun respectively, and may include but not be limited to a capacity message, a current message and a rating power message. After receiving the connection confirming signal from the connection confirming unit, the sending of a first message (e.g. the current message) to the receiving unit may be stopped to detect whether the working state corresponding to the first message is correct.

In step S15, it is judged whether a first report from the receiving unit of the charging gun in response to the first request is received by, for example, the controlling module.

In step S16, if the first report from the receiving unit is received, the power module is controlled to convert the AC electricity to the DC electricity to charge the peripheral device.

In some embodiments, the first report is a time-out report. If the time-out report is received in a preset time period, it can be determined that the working state corresponding to the first message is normal, and the power module can be controlled to convert the AC electricity to the DC electricity to charge the peripheral device.

In some embodiments of the present disclosure, the method for controlling the charging device may further comprise a step S17, in which it is judged whether the first request is a request of a last item to be sent to the receiving unit. The number and sequence of the requests are pre-set. If the first request is not a request of a last item, step S18 can be executed, in which a second request is sent to the receiving unit, followed by step S19, in which it is judged whether a second report in response to the second request is received by, for example, the controlling module. If the second report in response to the second request is received, step S110 can be executed, in which the power module is controlled to convert the AC electricity to the DC electricity to charge the peripheral device. The second request may also take a form of stopping sending messages to the receiving unit. The method for controlling a charging device according to embodiments of the present disclosure can judge whether the charging device is suitable for charging the peripheral device before the charging, which may improve the safety of the charging. In addition, as the charging device has the low voltage auxiliary power source in itself to supply power, the method may facilitate the mobility of the charging device as well as the charging to the peripheral device.

A method for detecting a peripheral device to be charged by a charging device will be described below with reference to FIG. 6.

Figure 6:
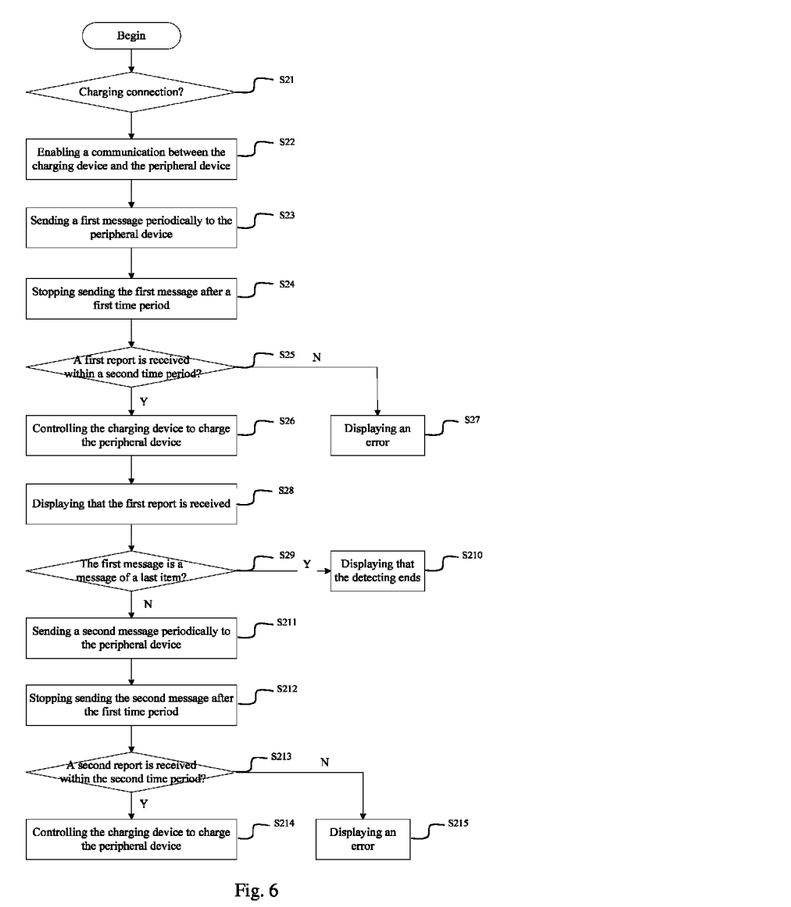
FIG. 6 is a flow chart illustrating an exemplary method for detecting a peripheral circuit to be charged by a charging gun, according to an embodiment of the present disclosure.

FIG. 6 is a flow chart illustrating an exemplary method for detecting a peripheral circuit to be charged by a charging gun, according to embodiments of the present disclosure. As shown in FIG. 6, the method for detecting a peripheral device to be charged by a charging device may comprise the following steps:

In step S21, it is detected whether the charging device is connected with a peripheral device. In some embodiments, the peripheral device may be an electric vehicle.

In step S22, if the charging device is detected to be connected with the peripheral device, communication is enabled between the charging device and the peripheral device. A low power sufficient for the communication may be provided to the peripheral device. Communication can be enabled between the charging device and a battery management in the electric vehicle through a communications network, such as CAN.

In step S23, a first message is sent periodically to the peripheral device. The first message can be sent between intervals of two seconds. The first message may be one of a capacity message, a current message and a rating power message.

In step S24, the sending of first message is stopped after a first time period. The first time period can be about 10 seconds.

In step S25, it is determined whether a first report in response to stopping sending the first message after the first time period is received from the peripheral device within a second time period.

In some embodiments, the peripheral device is configured to send a first report if it does not receive the first request in the second time period. The second time period can be about 4 seconds. If the first report is received within the second time period, it may indicate that the connection between the charging device and the peripheral device is normal, and the charging to the peripheral device can be performed.

In step S26, if a first report in response to stopping sending the first message after the first time period is received from the peripheral device within a second time period, the charging device can be controlled to charge the peripheral device.

In some embodiments of the present disclosure, the method for detecting the peripheral device to be charged by the charging device may further comprise step S27, in which an error is displayed if the first report in response to stopping sending the first message after the first time period is not received within the second time period from the peripheral device. The method may further comprise step S28, in which it is displayed that the first report is received. This allows people to easily recognize which item has a faulty working state.

In some embodiments of the present disclosure, the method for detecting the peripheral device to be charged by the charging device may also further comprise step S29, in which it is determined whether the first message is a message of a last item. The number and sequence of messages are pre-set. If the first message is the message of the last item, step S210 can be executed, in which it is displayed that the detecting ends (S210). If the first message is not the message of the last item, step S211 can be executed, in which a second message is sent periodically to the peripheral device. Step S212 can also be executed, in which the sending of the second message is stopped after the first time period. The method may further comprise step S213, in which it is determined whether a second report in response to stopping the second message after the first time period is received within the second time period from the peripheral device. If the second report is received, step S214 can be executed, in which the charging device is controlled to charge the peripheral device. If the second report is not received, step S215 can be executed in which an error is displayed. In some embodiments, the second message may also be one of the capacity message, the current message and the rating power message. After step S213, the method may further comprise a step (not shown in FIG. 6) of judging whether the second message is the message of the last item, and the judging step can be repeated until the message is the message of the last item as pre-set.

The method for detecting the peripheral device to be charged by the charging device according to embodiments of the present disclosure can detect whether the connection between the charging device and the peripheral device is normal, which may improve the safety of the charging.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the present disclosure as defined by the appended claims.

What is claimed is:

1. A charging device, comprising:
a charging gun;
a power module;
a low voltage auxiliary power source; and
a controlling module coupled with the charging gun and the power module, wherein the controlling module is configured to:
determine whether the charging gun is connected with a peripheral device to be charged;
send a first request to the peripheral device within a first time period;
determine whether a first message is received from the peripheral device after the first request is sent;
determine whether the first request is a last item to be sent to the peripheral device;
if the first request is not a last item to be sent to the peripheral device:
reset the low voltage auxiliary power source;
send a second request to the peripheral device;
if a second message is received from the peripheral device within a second time period after the second request is transmitted, control the power module to convert AC electricity to DC electricity to charge the peripheral device if the charging gun is determined to be connected to the peripheral device.

2. The charging device according to claim 1, wherein the controlling module is further configured to wait for a connection confirmation signal from the charging gun before sending the first request to the charging gun, and to wait for the first message from the charging gun before determining that the charging gun is connected to the peripheral device.

3. The charging device according to claim 2, wherein if the first request to be sent is not of a last item to be sent to the charging gun, the controlling module is further configured to send the second request after the first request is sent.

4. The charging device according to claim 2, wherein the controlling module is further configured to send a third request to stop the charging gun from sending the first message, and to receive a time-out signal from the charging gun after the third request is sent.

5. The charging device according to claim 1, wherein the first message indicates a working state of the charging gun.

6. The charging device according to claim 1, further comprising a leakage detecting module coupled with the controlling module, wherein the controlling module is further configured to control the leakage detecting module to detect a leakage of the charging device.

7. The charging device according to claim 1, wherein the controlling module is configured to send the second request after the low voltage auxiliary power source is reset.

8. The charging device according to claim 1, wherein the second message indicates a working state of the charging gun.

9. The charging device according to claim 2, wherein the second message indicates a working state of the charging gun.

10. A method for controlling a charging device, wherein the charging device comprises a charging gun, a power module, and a low voltage auxiliary power source, the method comprising:
determining whether the charging gun is connected with a peripheral device;
sending a first request to the peripheral device within a first time period;
determining whether a first message is received from the peripheral device after the first request is sent;
determining whether the first request is a last item to be sent to the peripheral device;
if the first request is not a last item to be sent to the peripheral device:
resetting the low voltage auxiliary power source;
sending a second request to the peripheral device;
if a second message is received from the peripheral device within a second time period after the one or more second requests are transmitted, controlling the power module to convert AC electricity to DC electricity to charge the peripheral device if the charging gun is determined to be connected to the peripheral device.

11. The method according to claim 10, wherein the determining whether the charging gun is connected with the peripheral device includes:
waiting for a connection confirming signal to judge whether the charging gun is connected with the peripheral device before sending the first request to the charging gun;
waiting for the first message before determining that the charging gun is connected to the peripheral device after receiving the first message.

12. The method according to claim 10, wherein at least one of the first message and the second message indicates a working state of the charging gun.

13. A method for detecting a peripheral device to be charged by a charging device, comprising:
determining whether the charging device is connected with a peripheral device; and
starting a communication between the charging device and the peripheral device responsive to determining that the charging device is connected with the peripheral device;
wherein the communication includes:

sending a first request to the peripheral device within a first time period;
determining whether a first message is received from the peripheral device after the first request is sent;
determining whether the first request is a last item to be sent to the peripheral device;
responsive to determining that the first request is not a last item to be sent to the peripheral device:
resetting the low voltage auxiliary power source;
sending a second request to the peripheral device;
responsive to determining that a second message is received from the peripheral device within a second time period after the second request is transmitted, controlling the charging device to charge the peripheral device.

14. The method according to claim 13, wherein at least one of the first message and the second message indicates a working state of the charging device.

\* \* \* \* \*